3,029,256
QUATERNARY AMMONIUM COMPOUNDS HAVING A 2-(5-OXY-γ-PYRONYL)METHYL GROUP

Richard Sherrard Cook, Doylestown, Pa., assignor to Rohm & Haas Company, Philadelphia, Pa., a corporation of Delaware
No Drawing. Filed Oct. 23, 1959, Ser. No. 848,196
5 Claims. (Cl. 260—345.8)

This invention concerns fungicidally active quaternary ammonium compounds which have low phytotoxicity toward growing plants. They have the structure

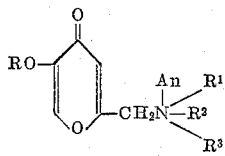

wherein An represents an anion, R represents hydrogen, an alkyl group up to four carbon atoms, or an acyl group (R*CO—, where R* is alkyl, alkenyl, or aryl), $R^1$ represents a lipophilic group of ten to 25 carbon atoms, including alkyl groups of at least 10 carbon atoms, preferably 12 to 18 carbon atoms, alkenyl groups of 11 to 18 carbon atoms, and arylaliphatic groups having at least 12 carbon atoms and preferably 15 to 25 carbon atoms, and $R^2$ and $R^3$ when taken individually represent alkyl groups of 1 to 2 carbon atoms, the β-hydroxyethyl group, or a benzyl group and when taken together, $R^2$ and $R^3$ form a divalent aliphatic chain of 4 to 5 carbon atoms which with the nitrogen forms a heterocycle, as —$CH_2CH_2CH_2CH_2$—, —$CH_2CH_2CH_2CH_2CH_2$—, or —$CH_2CH_2OCH_2CH_2$—, or the corresponding lower alkyl-substituted chains, as found in C-methyl-pyrrolidine, -piperidine, or -morpholine.

The lipophilic group is necessary for these quaternary ammonium salts to be active against fungi. Somewhat structurally similar compounds have been prepared with 3 alkyl groups of one to two carbon atoms each. These have proved to be, however, ineffective against fungi and rather toxic to plants. Other quaternary ammonium compounds are known which have lipophilic groups, such as (dodecylbenzyl)trimethylammonium chloride, dodecyl-(benzyl)dimethylammonium chloride, octylphenoxyethoxyethyl(benzyl)dimethylammonium chloride, and the like. All of these at 1% in water when applied to young tomato plants in the greenhouse have been observed to be highly phytotoxic. Even at 0.1% these compounds have caused moderate to severe damage on tomato plants in the hothouse.

The novel compounds of this invention are surprisingly effective against fungi which may attack various plants and yet are relatively safe when applied to plants at dilutions giving effective control of these fungi.

Quaternary ammonium compounds of the above structure are prepared by reacting a 2-halomethyl-5-oxy-γ-pyrone,

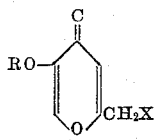

where R has the same significance as above and X is a halogen, chlorine, bromine, or iodine, with a tertiary amine, $R^1R^2R^3N$. Approximately equivalent quantities of the two reactants are mixed, preferably in a volatile organic solvent. The mixture is heated between 25° and 150° C. for a time sufficient to bring about essentially complete reaction. Solvent can then be taken off, as by filtration and/or distillation, to leave a residue, which may be an oil, a paste, or a solid. The product may be used as thus obtained or it may be purified, if so desired, as by charcoaling, extracting, or in the case of some solids, crystallizing from a suitable solvent.

Solvents for reaction include acetone, methyl ethyl ketone, methyl hexyl ketone, diethyl ketone, acetonitrile, nitromethane, ethyl acetate, naphtha, benzene, toluene, or xylene.

Typical tertiary amines for reaction include n-dodecyl-dimethylamine, n-dodecyldiethylamine, n-dodecylmethyl-hydroxyethylamine, n-dodecylmethylbenzylamine, cetyldi-methylamine, octadecyldimethylamine, octadecyl(hydroxyethyl)amine, N-myristylmorpholine, n-dodecylpiperidine, n-dodecylpyrrolidine, oleyldimethylamine, undecenyldiethylamine, (5,5,7,7-tetramethyl-2-octenyl)dimethylamine, (nonylmethylbenzyl)diethylamine, (dodecylbenzyl)dimethylamine, octylphenoxyethoxyethyldimethylamine, n o n ylphenoxyethoxyethoxyethylbenzylmethylamine, N-nonylphenoxyethoxyethylmorpholine, (diethylphenyl-2-pentenyl)dimethylamine, nonyloxypentenyldimethylamine, or nonylphenoxyethyldi(hydroxyethyl)-amine.

Typical 2-halomethyl-γ-pyrones include 2-chloromethyl-5-methoxy-γ-pyrone, 2-bromomethyl-5-ethoxy-γ-pyrone, 2-chloromethyl-5-hydroxy-γ-pyrone, 2-chloromethyl-5-acetoxy-γ-pyrone, 2-chloromethyl-5-benzoxy-γ-pyrone, 2-chloromethyl-5-propionoxy-γ-pyrone, 2-chloromethyl-5-acryloyloxy-γ-pyrone, 2-chloromethyl-5-crotonoxy-γ-pyrone, and 2-chloromethyl-5-($4^1$-chlorobenzoxy)-γ-pyrone. Instead of the γ-pyrone designation this nucleus is also termed 4H-pyran-4-one.

The 2-chloromethyl-5-hydroxy-γ-pyrone may be prepared by reacting 2-hydroxymethyl-5-hydroxy-γ-pyrone with thionyl chloride. Likewise, 2-hydroxymethyl-5-methoxy-γ-pyrone may be converted to the 2-chloromethyl derivative in the same way. The 5-hydroxy compound can readily be acylated with an acid anhydride. Thus 5-acetoxy-, 5-propionoxy-, 5-acryloxy-, 5-butyroxy-, 5-crotonoxy-, or 5-benzoxy-derivatives may be prepared. Instead of a carboxylic anhydride there may be used a corresponding acyl halide together with a basic reagent for taking up hydrogen halide.

In a typical preparation there are mixed 71 parts by weight of benzyldimethylamine, 80.3 parts of 2-chloromethyl-5-hydroxy-γ-pyrone, and 500 parts of toluene at about 10° C. Over an hour there is added with stirring 97 parts of p-chlorobenzoyl chloride at 5°–10° C. The mixture is heated to 50° C. and held at this temperature for two hours. Addition is made of 500 parts of water. An organic layer forms, is separated, is washed four times each with 500 parts of water, and dried over magnesium sulfate. Toluene is stripped off to yield 128 parts of brown solid. This is recrystallized from isopropanol to give 2-chloromethyl-5-p-chlorobenzoxy-γ-pyrone (melting point 113°–115° C.).

Details of the preparation of compounds of this invention are presented in the following illustrative examples. Parts are by weight unless otherwise designated.

EXAMPLE 1

A mixture of 80.5 parts of 2-chloromethyl-5-hydroxy-γ-pyrone, 151.5 parts of dimethyldodecylbenzylamine, and 500 parts acetone was refluxed with agitation for five hours. The solid that separated on cooling was filtered off, washed with acetone and dried for 18 hours at 50° C./25 mm. There was obtained 135.0 g. parts of tan solid (M.P.=196° C. with decomposition) of the following structure:

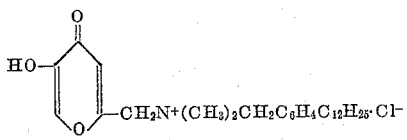

(dodecylbenzyl-2-(5-hydroxy-γ-pyronyl)methyl)dimethylammonium chloride.

*Analysis.*—Calcd. for $C_{27}H_{42}ClNO_3$: Cl, 7.65; Cl⁻, 7.65; N, 3.02. Found: Cl, 8.0; Cl⁻, 7.7; N, 2.97.

The biological data are as follows:

(a) *Fungitoxicity (Slide-Germination)*

|  | Alt. | Mon. | Stm. |
|---|---|---|---|
| ED₅₀ | 5-10 | 5-10 | 5-10 |

NOTE.—"Alt" is used as the abbreviation for *Alternaria solani*, "Mon" for *Monolinia fructicola*, and "Stm" for *Stemphylium sarcinaeforme*.

(b) *Tomato Phytotoxicity*

No injury at 1¼ lbs./100 gal.

(c) *Apple Scab* (Venturia inaequalis)

On apple seedling (McIntosh) this compound gave 100% eradication at ¾ lb./100 gal. and 68% at ¼ lb./100 gal. At ¾ lb./100 gal. there was no injury.

The above procedure was followed, but with use of methyl isobutyl ketone as the solvent. The same compound was obtained.

The procedure above is followed with substitution of N-dodecylbenzylmorpholine (173 parts). The product is dodecylbenzyl-2-(5-hydroxy-γ-pyronyl)methylmorpholinium chloride. Fungitoxicity of this compound as determined by the slide-germination technique gives ED₅₀ values against the above test organisms of 10–50 p.p.m.

EXAMPLE 2

A mixture of 80.5 parts of 2-chloromethyl-5-hydroxy-γ-pyrone, 160.5 parts of β-(4-t-octylphenoxyethoxy)ethyldimethylamine and 500 parts of acetone was refluxed for 6 hours with agitation. The solid that separated on cooling was filtered off, washed with acetone and air dried. There was obtained 150 parts of tan solid (M.P.=187° C. with decomposition) of the following structure

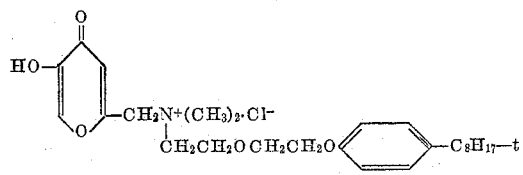

([β-(4'-t-octylphenoxyethoxy)ethyl]-2-(5-hydroxy-γ-)pyronyl)methyldimethylammonium chloride.

*Analysis.*—Calcd. for $C_{26}H_{40}ClNO$: Cl, 7.35, Cl⁻, 7.35, N, 2.9. Found: Cl, 8.3, C⁻, 8.3, N, 2.86.

The biological data are as follows:

(a) *Fungitoxicity (Slide-Germination)*

|  | Alt. | Mon. | Stm. |
|---|---|---|---|
| ED₅₀ | 10-50 | 10-50 | 10-50 |

(b) *Tomato Phytotoxicity*

No injury at 1¾ lb./100 gal.

(c) *Apple Scab*

Percent eradication: 89 at ¾ lb./100 gal.; percent protection: 87 at ¼ lb./100 gal.

EXAMPLE 3

A mixture of 21.8 parts of 2-chloromethyl-5-hydroxy-γ-pyrone, 28.5 parts of dimethyldodecenylamine, and 200 parts of acetone was refluxed with agitation for 24 hours. The solid that separated on cooling was filtered off, washed with acetone and dried at 50° C./25 mm. There was obtained 43 parts of white solid (M.P.=210° C. with decomposition) of the following structure:

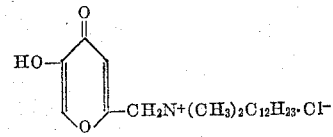

(dodecenyl-2-(5-hydroxy-γ-pyronyl)methyldimethylammonium)chloride.

*Analysis.*—Calcd. for $C_{20}H_{34}ClNO_3$: Cl, 9.6; Cl⁻, 9.6; N, 3.78. Found: Cl, 10.3; Cl⁻, 10.3; N, 3.7.

The following are typical biological data:

*Fungitoxicity (Slide-Germination)*

|  | Alt. | Mon. | Stm. |
|---|---|---|---|
| ED₅₀ | 10-50 | 50-200 | 10-50 |

EXAMPLE 4

A mixture of 20.1 parts of 2-chloromethyl-5-hydroxy-γ-pyrone, 41.5 parts of dimethyldodecylmethylbenzylamine, and 100 parts of acetone was refluxed for four hours with agitation. The solid that separated on cooling was removed by filtration, washed with acetone and dried at 50° C./25 mm. There was obtained 54 parts of tan solid (M.P.=97–100° C.) of the following structure:

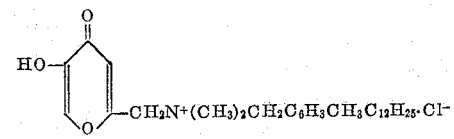

(dodecylmethylbenzyl-2-(5-hydroxy-γ-pyronyl)-methyl)dimethylammonium chloride.

*Analysis.*—Calcd. for $C_{28}H_{44}ClNO_3$: Cl, 7.42; Cl⁻, 7.42; N, 2.92. Found: Cl, 7.42; Cl⁻, 8.4; N, 2.86.

The biological data are as follows:

*Fungitoxicity (Slide-Germination)*

|  | Alt. | Mon. | Stm. |
|---|---|---|---|
| ED₅₀ | 10-50 | 1-10 | 1-10 |

EXAMPLE 5

A mixture of 15.0 parts of 2-chloromethyl-5-hydroxy-γ-pyrone, 20.0 parts of dimethyldodecylamine, and 150 parts of methyl ethyl ketone was refluxed for 18 hours with agitation. The solid that separated on cooling was filtered off, washed and dried at 50° C./25 mm. There was obtained 31 parts of white solid (M.P.=185–188° C. with decomposition) of the following structure:

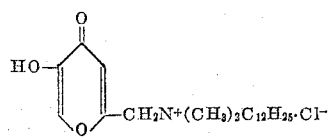

(dodecyl-2-(5-hydroxy-γ-pyronyl)methyldimethylammonium chloride).

*Analysis.*—Calcd. for $C_{20}H_{36}ClNO_3$: Cl, 9.5; Cl⁻, 9.5; N, 3.74. Found: Cl, 9.45; Cl⁻, 9.42; N, 3.64.

The biological data are as follows:

*Fungitoxicity (Slide-Germination)*

|      | Alt.  | Mon.  | Stm. |
|------|-------|-------|------|
| ED₅₀ | 10-50 | 10-50 | 1-10 |

EXAMPLE 6

A mixture of 24.0 parts of 2-chloromethyl-5-hydroxy-γ-pyrone, 36.3 parts of tetradecyldimethylamine, and methyl ethyl ketone (300 parts) was refluxed for 18 hours with agitation. The solid was removed by filtration, washed with methyl ethyl ketone, and dried at 50° C./25 mm. There was obtained 53 parts of light tan solid (M.P.=187° C. with decomposition) of the following structure:

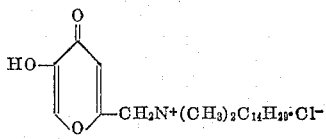

(tetradecyl - 2 - (5 - hydroxy - γ - pyrone)methyldimethylammonium chloride).

*Analysis.*—Calcd. for $C_{22}H_{40}ClNO_3$: Cl, 8.85; Cl⁻, 8.86; N, 3.48. Found: Cl, 8.88; Cl⁻, 8.83; N, 3.41.

The biological data are as follows:

*Fungitoxicity (Slide-Germination)*

|      | Alt.  | Mon.  | Stm. |
|------|-------|-------|------|
| ED₅₀ | 1-10  | 1-10  | 1-10 |

EXAMPLE 7

A mixture of 20.1 parts of 2-chloromethyl-5-hydroxy-γ-pyrone, 44.5 parts of cetyldimethylamine based on a neutral equivalent of 363, and 200 parts of methyl ethyl ketone was refluxed for 20 hours with agitation. The solid was removed by filtration, washed, and dried at 50° C./25 mm. There was obtained 43 parts of brown solid (M.P.=152–165° C.) of the following structure:

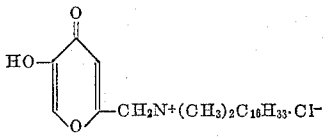

(cetyl - 2 - (5 - hydroxy-γ-pyronyl)methyldimethylammonium chloride).

*Analysis.*—Calcd. for a molecular weight of 524 (based on the neutral equivalent of the amine): Cl, 6.76; Cl⁻, 6.76; N, 6.76. Found: Cl, 6.70; Cl⁻, 6.60; N, 6.60.

The biological data are as follows:

*Fungitoxicity (Slide-Germination)*

|      | Alt.  | Mon.  | Stm.  |
|------|-------|-------|-------|
| ED₅₀ | 10-50 | 10-50 | 10-50 |

EXAMPLE 8

A mixture of 2-chloromethyl-5-methoxy-γ-pyrone (17.5 parts), 34.9 parts of dimethyldodecylbenzylamine, and 100 parts of methyl ethyl ketone was refluxed for 3 hours with agitation. The solid was filtered off, washed and dried. There was obtained 34.5 parts of white solid (M.P.=173–76°) of the following structure:

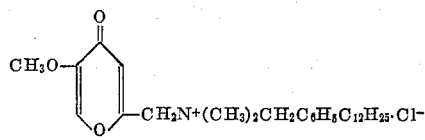

(dodecylbenzyl-2-(5-methoxy-γ-pyronyl)methyldimethylammonium chloride.

*Analysis.*—Calcd. for $C_{28}H_{44}ClNO_3$: Cl, 7.42; Cl⁻, 7.42; N, 2.92. Found: Cl, 7.5; Cl⁻, 7.5; N, 2.78.

The biological data are as follows:

(a) *Fungitoxicity (Slide-Germination)*

|      | Alt.  | Mon.  | Stm. |
|------|-------|-------|------|
| ED₅₀ | 1-10  | 1-10  | 1-10 |

(b) *Apple Scab*

Percent eradication: 90 at ¾ lb./100 gal.
Very slight injury.

The above procedure is followed with substitution of 20.6 parts of dodecyl(methyl)benzylmorpholine for the above amine. The product is waxy without a sharp melting point and corresponds in composition to N-dodecyl(methyl)benzyl - 2 - (5 - methoxy-γ-pyronyl)methylmorpholinium chloride. It gives ED₅₀ values of about 10 p.p.m.

In the same way N-substituted pyrrolidines and piperidines may be used to give corresponding quaternary ammonium salts of similar properties.

EXAMPLE 9

A mixture of 17.5 parts of 2-chloromethyl-5-methoxy-γ-pyrone, 33.0 parts of β-(4-tert-octylphenoxyethoxy)ethyldimethylamine, and 100 parts of methyl ethyl ketone was refluxed for two hours. Removal of the solvent by distillation under reduced pressure yielded 51.0 parts of brown solid (M.P.=124–134° C.) of the following structure:

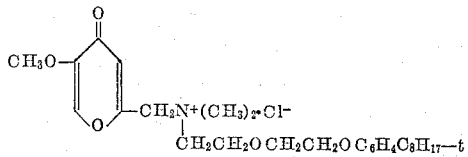

([β-(4'-tert-octylphenoxyethoxy)ethyl] - 2 - (5-methoxy-γ-)pyronyl)methyldimethylammonium chloride.

*Analysis.*—Calcd. for $C_{27}H_{42}ClNO_5$: Cl, 7.16; Cl⁻, 7.16; N, 2.82. Found: Cl, 7.16; Cl⁻, 6.7; N, 2.7.

*Fungitoxicity (Slide-Germination)*

|      | Alt.  | Mon.  | Stm. |
|------|-------|-------|------|
| ED₅₀ | 10-50 | 10-50 | <1   |

EXAMPLE 10

A mixture of 2-chloromethyl-5-acetoxy-γ-pyrone (20.2 parts), 35.0 parts of dimethyldodecylbenzylamine, and methyl ethyl ketone (200 parts) was refluxed for 18 hours with agitation. The solid that separated on cooling was filtered off, washed, and dried. There was obtained 33.0 parts of tan solid (M.P.=186–189° C.) of the following structure:

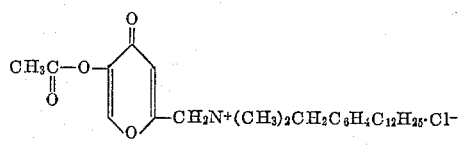

(dodecylbenzyl-2-(5-acetoxy-γ-pyronyl)methyl)dimethylammonium chloride.

*Analysis.*—Calcd. for $C_{29}H_{44}ClNO_4$: Cl, 7.04; Cl⁻, 7.04; N, 2.78. Found: Cl, 7.14; Cl⁻, 6.95; N, 2.73.

The biological data are as follows:

(a) *Fungitoxicity (Slide-Germination)*

|  | Alt. | Mon. | Stm. |
|---|---|---|---|
| $ED_{50}$ | 1-10 | 1-10 | 1-10 |

(b) *Phytotoxicity (Apple Seedlings)*

1 lb./100 gal.=Very slight injury.
½ lb./100 gal.=Very slight injury.

EXAMPLE 11

A mixture of 20.2 parts of 2-chloromethyl-5-acetoxy-γ-pyrone, 54.5 parts of β-(4′-tert-octylphenoxyethoxy)ethyldimethylamine, and methyl ethyl ketone (200 parts) was refluxed for 18 hours with agitation. The solid was filtered off, washed and dried. There was obtained 44.0 parts of white solid (M.P.=171–175° C. with decomposition) of the following structure:

$$CH_3C(O)-O-\text{[pyrone]}-CH_2N^+(CH_3)_2Cl^- | CH_2CH_2OCH_2CH_2OC_6H_4C_8H_{17}-t$$

([β-(4′-tert-octylphenoxyethoxy)ethyl]-2-(5-acetoxy-γ-)pyronyl)-methyldimethylammonium chloride.

*Analysis.*—Calcd. for $C_{28}H_{42}ClNO_6$: Cl, 6.78; Cl⁻, 6.78; N, 2.68. Found: Cl, 6.94; Cl⁻, 6.69; N, 2.63.

The biological data are as follows:

*Fungitoxicity (Slide-Germination)*

|  | Alt. | Mon. | Stm. |
|---|---|---|---|
| $ED_{50}$ | 10-50 | 10-50 | 10-50 |

EXAMPLE 12

A mixture of 21.7 parts of 2-chloromethyl-5-propionoxy-γ-pyrone, 35.0 parts of dimethyldodecylbenzylamine, and 300 parts of methyl ethyl ketone was refluxed for 18 hours with agitation. The solid was filtered off, washed, and dried at 50° C./25 mm. There was obtained 39.0 parts of light tan solid (M.P.=187–189° C. with decomposition) of the following structure:

$$CH_3CH_2C(O)-O-\text{[pyrone]}-CH_2N^+(CH_3)_2CH_2C_6H_4C_{12}H_{25}\cdot Cl^-$$

(dodecylbenzyl-2-(5-propionoxy-γ-pyronyl)methyl)dimethylammonium chloride.

*Analysis.*—Calcd. for $C_{30}H_{46}ClNO_4$: Cl, 6.83; Cl⁻, 6.83; N, 2.69. Found: Cl, 6.86; Cl⁻, 6.86; N, 2.68.

The biological data are as follows:

*Fungitoxicity (Slide-Germination)*

|  | Alt. | Mon. | Stm. |
|---|---|---|---|
| $ED_{50}$ | 1-10 | 1-10 | 1-10 |

EXAMPLE 13

A mixture of 21.7 parts of 2-chloromethyl-5-propionoxy-γ-pyrone, 33.0 parts of β-(4′-tert-octylphenoxyethoxy)ethyldimethylamine, and 300 parts of methyl ethyl ketone was refluxed for 18 hours with agitation. The solid that separated on cooling was filtered off, washed with methyl ethyl ketone, and dried at 50° C./25 mm. There was obtained 43.0 parts of tan solid (M.P.=162–167° C. with decomposition) of the following structure:

$$CH_3CH_2C(O)-O-\text{[pyrone]}-CH_2N^+(CH_3)_2Cl^- | CH_2CH_2OCH_2CH_2OC_6H_4C_8H_{17}-t$$

([β-(4′-tert-octylphenoxyethoxy)ethyl]-2-(5-propionoxy-γ-pyronyl)methyldimethylammonium chloride.

*Analysis.*—Calcd. for $C_{29}H_{44}NO_6Cl$: Cl, 6.59; Cl⁻, 6.59; N, 2.6. Found: Cl, 6.34; Cl⁻, 6.36; N, 2.46.

The biological data are as follows:

*Fungitoxicity (Slide-Germination)*

|  | Alt. | Scl. | Stm. |
|---|---|---|---|
| $ED_{50}$ | <1 | 1-10 | 1-10 |

EXAMPLE 14

A mixture of 12.5 parts of 2-chloromethyl-5-crotonoxy-γ-pyrone, 19.3 parts of dimethyldodecylbenzylamine, and 150 parts of methyl ethyl ketone was refluxed for 18 hours with agitation. The slurry was cooled and the solid filtered off, washed with methyl ethyl ketone and dried at 50° C./25 mm. There was obtained 21.0 parts of white solid (M.P.=176–185° C. with decomposition) of the following structure:

$$CH_3CH=CHC(O)-O-\text{[pyrone]}-CH_2N^+(CH_3)_2CH_2C_6H_4C_{12}H_{25}\cdot Cl^-$$

(dodecylbenzyl-2-(5-crotonoxy-γ-pyronyl)methyl)dimethylammonium chloride.

*Analysis.*—Calcd. for $C_{31}H_{46}ClNO_4$: Cl, 6.65; Cl⁻, 6.65; N, 2.62. Found: Cl, 6.73; Cl⁻, 6.74; N, 2.62.

The biological data are as follows:

*Fungitoxicity (Slide-Germination)*

|  | Alt. | Mon. | Stm. |
|---|---|---|---|
| $ED_{50}$ | 1-10 | 1-10 | 1-10 |

EXAMPLE 15

A mixture of 11.0 parts of 2-chloromethyl-5-crotonoxy-γ-pyrone, 16.0 parts of β-(4-tert-octylphenoxyethoxy)ethyldimethylamine, and 125 parts of methyl ethyl ketone was refluxed for 4½ hours with agitation. The slurry was cooled and the solid filtered off, washed with methyl ethyl ketone, and dried at 50° C./25 mm. There was obtained 17 parts of white solid (M.P.=175° C. with decomposition) of the following structure:

$$CH_3CH=CHC(O)-O-\text{[pyrone]}-CH_2N^+(CH_3)_2Cl^- | CH_2CH_2OCH_2CH_2OC_6H_4C_8H_{17}-t$$

([β-(4′-tert-octylphenoxyethoxy)ethyl]-2-(5-crotonoxy-γ-)pyronyl)-methylidimethylammonium chloride.

*Analysis.*—Calcd. for $C_{30}H_{44}ClNO_6$: Cl, 6.47; Cl⁻, 6.47; N, 2.56. Found: Cl, 6.47; Cl⁻, 6.5; N, 2.41.

The biological data are as follows:

*Fungitoxicity (Slide-Germination)*

|  | Alt. | Mon. | Stm. |
|---|---|---|---|
| $ED_{50}$ | 10-50 | 10-50 | 10-50 |

EXAMPLE 16

A mixture of 29.9 parts of 2-chloromethyl-5-(4'-chlorobenzoxy)-γ-pyrone, 35.0 parts of dodecylbenzyldimethylamine, and methyl ethyl ketone (300 parts) was refluxed for 5 hours with agitation. The slurry was cooled and the solid removed by filtration, washed with methyl ethyl ketone and dried at 50° C./25 mm. There was obtained 37 parts of tan solid (M.P.=171–174° C.) of the following structure:

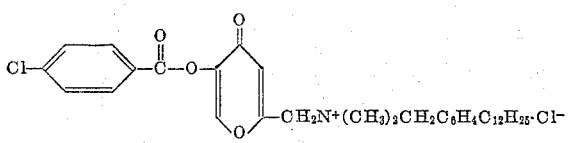

(dodecylbenzyl - 2 - [5 - (4' - chlorobenzoxy) - γ - pyronyl])methyldimethyl-ammonium chloride.

*Analysis.*—Calcd. for: Cl, 11.7; Cl⁻, 5.87; N, 2.32. Found: Cl, 11.3; Cl⁻, 5.6; N, 2.3.

The biological data are as follows:

*Fungitoxicity (Slide-Germination)*

|  | Alt. | Mon. | Stm. |
| --- | --- | --- | --- |
| ED$_{50}$ | 10–50 | <1 | <1 |

EXAMPLE 17

A mixture of 29.9 parts of 2-chloromethyl-5-(4'-chlorobenzoxy)-γ-pyrone, 32.7 parts of β-(4'-tert-octylphenoxyethoxy)-ethyldimethylamine, and methyl ethyl ketone (300 parts) was refluxed for five hours with agitation. The slurry was cooled and the solid filtered off, washed with methyl ethyl ketone and dried at 50° C./25 mm. There was obtained 54.5 parts of tan solid (M.P.=170–173° C.) of the following structure:

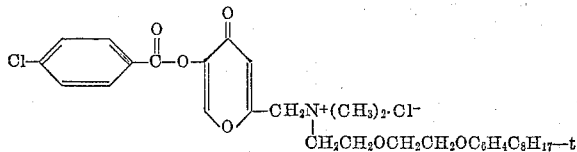

[β - (4' - tert - octylphenoxyethoxy)ethyl] - 2 - [5 - (4''-chlorobenzoxy) - γ - pyronyl]methyldimethylammonium chloride.

*Analysis.*—Calcd. for: Cl, 11.4; Cl⁻, 5.73; N, 2.26. Found: Cl, 10.9; Cl⁻, 5.4; N, 2.3.

The biological data are as follows:

*Fungitoxicity (Slide-Germination)*

|  | Alt. | Mon. | Stm. |
| --- | --- | --- | --- |
| ED$_{50}$ | 10–50 | 1–10 | 1 |

While in the examples there has been used the chloromethyl group, there may be used in the identical way the bromomethyl group. The resulting quaternary ammonium bromides are at least as effective as the corresponding chlorides and in some instances are more active.

As is known in the art, the chloride or bromide ion may be replaced in known ways with other anions. Thus, a concentrated solution of a quaternary ammonium chloride may be treated with a sodium phosphate solution to exchange anions with formation of quaternary ammonium phosphate. Through conversion of halide to hydroxide and subsequent neutralization any anion can be introduced, including acetate or propionate, as typical anions of organic acids. It is thus possible to have present any desired anion.

I claim:

1. Compounds of the formula

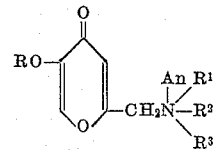

wherein An represents an inert anion, $R^1$ represents a lipophilic group selected from the class consisting of alkyl groups of 12 to 18 carbon atoms, alkenyl groups of 11 to 18 carbon atoms and alkylphenyl, alkylphenylalkyl, alkylphenylalkenyl, alkylphenoxyalkoxyalkyl, alkylphenoxyalkoxyalkoxy, alkoxyalkenyl and alkylphenoxyalkyl of 12 to 25 carbon atoms, $R^2$ and $R^3$ when taken individually represent groups from the class consisting of alkyl groups of one to two carbon atoms, the hydroxyethyl group, and the benzyl group and, when taken together, a divalent chain from the class consisting of

—CH$_2$CH$_2$CH$_2$CH$_2$—

—CH$_2$CH$_2$CH$_2$CH$_2$CH$_2$—, and —CH$_2$CH$_2$OCH$_2$CH$_2$— and the methyl-substituted derivatives thereof, and R is a monocarboxylic group R*CO— where R* is a member of the class consisting of phenyl groups and alkyl and alkenyl groups of one to three carbon atoms.

2. N - [β - (β' - (4' - tert - octylphenoxy)ethoxy)ethyl] - N - (2 - (5 - acetoxy - γ - pyronyl)methyl) - N,N-dimethylammonium chloride.

3. N - dodecylbenzyl - N - (2 - (5 - propionoxy - γ-pyronyl) - methyl) - N,N - dimethylammonium chloride.

4. N - dodecylbenzyl - N - (2 - (5 - crotonoxy - γ-pyronyl) - methyl) - N,N - dimethylammonium chloride.

5. N - dodecylbenzyl - N - (2 - [5 - (4' - chlorobenzoxy)-γ-pyronyl]methyl)N,N-dimethylammonium chloride..

References Cited in the file of this patent

UNITED STATES PATENTS

| 2,812,350 | Niederhauser | Nov. 5, 1957 |
| 2,918,402 | Fredrick | Dec. 22, 1959 |

OTHER REFERENCES

Campbell et al.: Journ. Org. Chem., vol. 15, pages 221–6 (1950).